United States Patent
Sakai et al.

(10) Patent No.: US 6,455,105 B1
(45) Date of Patent: Sep. 24, 2002

(54) INTERMITTENT COATING SYSTEM AND INTERMITTENT COATING METHOD

(75) Inventors: Yoshiyuki Sakai; Tatsuya Yoshikawa; Akinori Ide, all of Shizuoka-ken (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/148,490

(22) Filed: Sep. 4, 1998

(30) Foreign Application Priority Data

Sep. 5, 1997 (JP) .............................. 9-241460
Jul. 17, 1998 (JP) ........................... 10-203868

(51) Int. Cl.⁷ .............................................. B05D 5/00
(52) U.S. Cl. ...................... 427/287; 427/256; 427/210; 118/669; 118/410; 118/684
(58) Field of Search ................ 118/683, 684, 118/669, 410, 419, 679; 427/356, 210, 209, 287, 123, 126.1, 256

(56) References Cited

U.S. PATENT DOCUMENTS

| 3,758,904 A | * | 9/1973 | Kamborian et al. | |
|---|---|---|---|---|
| 4,258,089 A | * | 3/1981 | Anderson et al. | |
| 4,457,259 A | * | 7/1984 | Samuels | |
| 4,533,563 A | * | 8/1985 | Dahlgren et al. | |
| 4,938,994 A | | 7/1990 | Choinski | |
| 4,972,798 A | * | 11/1990 | Ando et al. | |
| 5,183,508 A | * | 2/1993 | Cholinski | 118/410 |
| 5,516,545 A | * | 5/1996 | Sandlock | 427/294 |
| 5,536,313 A | | 7/1996 | Watanabe et al. | |
| 5,650,011 A | | 7/1997 | Yoshinaga | |
| 5,733,597 A | * | 3/1998 | Schmitkons et al. | 427/420 |

FOREIGN PATENT DOCUMENTS

| JP | 7-68208 | 3/1995 |
|---|---|---|
| JP | 08 257467 | 10/1996 |

* cited by examiner

*Primary Examiner*—Brenda A. Lamb
(74) *Attorney, Agent, or Firm*—Finnegan, Henderson, Farabow, Garrett, & Dunner, L.L.P.

(57) ABSTRACT

An upper die unit (37) and a lower die unit (39) are disposed in opposition, with a gap, to a substrate (31) being conveyed, and provided with coating agent supply flow paths (97, 99) which have inlet paths (103, 105) for a coating agent to flow in and delivery ports (101, 102) for delivering the coating agent to coat the substrate (31) therewith. An accumulation piece (119, 121) installed in a flow path part (97b, 99b) of each die unit (37, 39) moves in the direction in which it goes away from the flow path part (97b, 99b), drawing in the coating agent, dwelling the delivery of the coating agent from the delivery port (101, 102), forming a non-coated part (F), and repeats a reciprocating action, repeating a coating and non-coating. An elastic plate (355) on a way of the coating agent supply flow path (339) is displaced in accordance with advance/retreat actions of a piston member (363) caused by a rotation of a cam (387).

21 Claims, 13 Drawing Sheets

INTERMITTENT COATING SYSTEM AND INTERMITTENT COATING METHOD

BACKGROUND OF THE INVENTION

1. Field of the Invention

The invention relates to an intermittent coating system and an intermittent coating method for coating a surface of a substrate with a coating agent in an intermittent manner along a conveyance direction of the substrate.

2. Description of Relevant Art

FIG. 1 illustrates a conventional intermittent coating system C1. The coating system C1 is for intermittently coating an electrode substrate 3 of a lithium ion secondary battery, with of an electrode composite material as a coating agent 7. The substrate 3 is wound on a roller 1, to be conveyed in a direction A, and the coating agent 7 is applied thereto from a slit die 5 arranged at a side of the roller 1.

The slit die 5 has a supply flow path with a delivery opening at the end and, into this flow path, the coating agent within a tank 9 is fed by action of a pump 11. An open/close valve 15 is installed on a piping 13 upstream the slit die 5 and is controlled by a controller 17. The controller 17 detects a non-coated part of the intermittently coated substrate 3 by a sensor 19 and controls the open/close timing of the valve 15, thereby forming a non-coated part. The slit die 5 is rotatable about a support shaft 20 from a solid-line position a two-dot chain line position.

FIG. 2 illustrates another conventional intermittent coating system C2. This intermittent coating system C2 is arranged such that on a substrate 23 that is conveyed in a B direction while being wound on a roller 21 there is coated a coating agent on a coating roller 25 that rotates in the reverse direction. A doctor knife 29 is disposed above the coating roller 25.

When moving a end of this knife 29 toward or away from the coating roller 25, the coating agent is intermittently adhered on the coating roller 25 and, by transferring this coating agent on the substrate 23, an intermittent coating process is executed.

When having interrupted the supply of the coating agent by the open/close valve 15 in the coating system C1, a coating drip occurs from the delivery opening due to the residual pressure in the supply flow path and as a result it is difficult to obtain a coat film having a uniform thickness. When rocking the slit die 5 to the two-dot chain line in order to prevent this, a larger length of time is needed for the execution of the coating process to that extent, with the result that the productivity is decreased.

In addition, the coating agent is coated on the substrate 3 on the roller 1 and therefore the coating form is a type of one-side surface coating. Further, intermittent control is performed by sensing the non-coated part. Therefore, it is difficult to increase the coating speed and thereby compensate for the decrease in the productivity.

Further, when having restarted the supply of the coating agent by opening the valve 15, the coating agent at the end from which coating is started builds up due to the residual pressure. In this respect as well, it is difficult to obtain a coat film having a uniform thickness.

A high precision of the another coating system C2 is needed for positioning the coating roller 25 to the substrate 23 and for positioning the knife 29 to the coating roller 25. As a result, the relevant cost increases.

Further, the coating agent makes its flowing movement over the coating roller 25 and therefore the uniformity in the thickness of the coat film is impaired.

In addition, the coating form is a type of one-side surface coating as in the case of the coating system C1 and therefore this coating system C2 has a drawback in terms of the productivity.

SUMMARY OF THE INVENTION

The invention has been achieved with such points in view.

It therefore is an object of the invention provide an intermittent coating system and method which make it possible to obtain the coating speed that is relatively high, in addition make it possible to form a coat film having a uniform thickness, and make it also possible to realize this at a relatively low cost.

It is also an object of the invention provide an intermittent coating system and method which provides a relatively high productivity.

According to an aspect of the invention, there is provided an intermittent coating system which comprises a coating agent source that delivers a coating agent at a constant flow rate, a flow path that guides the coating agent thus delivered, a die unit that coats the coating agent supplied from the flow path on a surface of a substrate, an accumulator that is communicating with the flow path and accumulates the coating agent at an upstream position of the die unit, and a controller that controls the volume of the accumulator.

According to this aspect of the invention, the coating agent delivered from the coating agent source, whose flow rate is fixed, is guided along the flow path and is supplied to the die unit at the flow rate that corresponds to a change in the volume of the accumulator communicating with this flow path at the upstream position of the die unit and thus is coated on the surface of the substrate.

If the volume of the accumulator is fixed, the coating agent whose flow rate is fixed is supplied to the die unit and the coat film formed thereby becomes uniform in thickness. If the volume of the accumulator is increased, the coating agent is drawn thereinto, whereby the supply thereof to the die unit is interrupted. And as a result the intermittent coating becomes possible. If the volume of the accumulator is largely changed, it is possible to draw in the coating agent part that is being supplied to the downstream side as well as the increment in the amount of the coating agent supplied from the upstream side. And as a result neither drip nor fall of the coating agent from the die unit occurs and the end edge of the coat film becomes defined or sharpened. The coating agent thus drawn in may be recovered at the non-coating time or may partly be used for shaping at the coating start time. The present system performs the intermittent coating process through the control of the flow rate and therefore can execute a relatively high precision coating at a relatively low cost.

Preferably, the accumulator is comprised of an accumulation chamber and a fitting member that is slidably fitted into the accumulation chamber and the controller includes a drive mechanism for driving the fitting member.

Preferably, the fitting member comprises a piston member, a rubber plate member or an elastic plate number.

Preferably, the drive mechanism includes a cam corresponding to an intermittent cycle and a cam follower that is engaged with this cam.

Preferably, the system further comprises another flow path that guides the coating agent delivered at a constant flow rate, another die unit that coats the coating agent supplied from this another flow path on a reverse surface of the substrate, and another accumulator that is communicating with the another flow path and accumulates the coating agent at the upstream position of the another die unit.

According to another aspect of the invention, in order to attain the above object, there is provided an intermitted coating method which comprises the steps of discharging a coating agent at a constant flow rate, guiding the delivered coating agent along a flow path and supplying it to a die unit, coating the coating agent supplied to the die unit on a surface of a substrate, and accumulating the coating agent guided along the flow path at an upstream position of the die unit and thereby interrupting the supply thereof to the die unit and thereby dwelling the coating thereof on the surface of the substrate.

In order to attain the above object, according to still another aspect of the invention, there is provided an intermittent coating system, wherein a die unit for coating a coating agent on an obverse surface of a substrate being conveyed is disposed close to the surface of the substrate, and provided with a coating agent supply flow path having an open delivery port, and an accumulation piece located on a way of the coating agent supply flow path and reciprocatingly movable between a coating agent supply position for supplying the coating agent on the surface of the substrate in a state located close to the coating agent supply flow path and a coating agent supply interrupt position for forming a coating agent suction space communicating with the coating agent supply flow path in a state spaced off from the coating agent supply flow path to dwell supplying the coating agent on the surface of the substrate.

According to this construction, in a state where the accumulation piece is kept moved to the coating agent supply flow path, the coating agent that flows through the coating agent supply flow path is delivered from the delivery port and is supplied to the substrate and coated. On the other hand, when the accumulation piece is moved away from the coating agent supply flow path and the coating agent solution space is thereby formed, the coating agent that flows through the coating agent supply flow path is into this coating agent suction space and does not flow to the delivery port, whereby the supply thereof to the substrate is dwelled. By performing the supply of the coating agent on the substrate and the dwelling of this supply through the reciprocating movements of the accumulation piece, the substrate that is being conveyed has the coating agent intermittently coated thereon in the direction of the conveyance thereof, intermittent coating is executed.

Namely, the supply of a coating agent on the substrate and the dwelling of this supply made for the purpose of intermittent coating process are performed by causing the coating agent in the vicinity of the delivery port to be drawn into the coating agent suction space formed by the reciprocating movements of the accumulation piece. Therefore, the coating drips from the delivery port and the buildups of the coat film at the time when starting the formation of the coated parts do not occur, with the result that a smooth and high precision coat surface is obtained and also the time lag of the coating speed does not occur, with the result that the productivity is enhanced. Also, since the coating system is made into a structure wherein the accumulation piece is reciprocatingly moved, nor is it necessary to perform a high precision machining to such an extent as to make it difficult to manufacture the system.

According to another aspect of the invention, the delivery port of the coating agent supply flow path is provided over an almost entire width of the substrate and, in correspondence therewith, the accumulation piece and the coating agent suction space are also provided over an almost entire width of the substrate.

According to this construction, the intermittent coating process is executed over an almost entire width of the substrate and this makes it possible to obtain a smooth coat surface.

According to another aspect of the invention, the coating agent suction space is provided in the vicinity of the delivery port of the coating agent supply flow path.

According to this construction, the coating agent supply flow path between the delivery port thereof and the coating agent suction space becomes short, with the result that the coating agent flowing through this supply flow path part is reliably drawn into the coating agent suction space side. As a result, a smoother coat surface is obtained and higher precision intermittent coating becomes possible.

According to another aspect of the invention, the die unit is provided with a regulating part that stops the movement of the accumulation piece to a coating agent supply flow path side, and the accumulation piece is pressed against the regulating part side by a spring and is moved to a side opposite to the regulating part side against the elastic force of the spring by means of a cam.

According to this construction, in a state where the accumulation piece is pressed by the spring and brought into abutment with the regulating part, the coating agent that flows through the coating agent supply flow path is supplied on the substrate through the delivery port. On the other hand, through the movement of the accumulation piece made by the cam in the direction of its being moved away from the coating agent supply flow path, the coating agent suction space into which the coating agent is formed, with the result that the supply of the coating agent on the substrate is dwelled. Accordingly, the accumulation piece is reliably reciprocated by actions of the cam and spring and this makes it possible to perform a higher precision intermittent coating.

According to another aspect of the invention, the accumulation piece is pressed to a side opposite to the side wherein the coating agent supply flow path is located by means of a spring and is moved to the coating agent supply flow path side against the elastic force of the spring by means of a cam.

According to this construction, in a state where the accumulated piece is kept moved to the coating agent supply flow path side being pressed against the elastic force of the spring by means of the cam, the coating agent that flows through the coating agent supply flow path is supplied on the substrate through the delivery port. On the other hand, through the movement of the accumulation piece made by the spring in the direction of its being moved away from the coating agent supply flow path, the coating agent suction space into which the coating agent is drawn is formed, with the result that the supply of the coating agent on the substrate is dwelled.

When the accumulation piece is moved from the coating agent supply dwelling position thereof to the coating agent supply position thereof, it is gently pressed by the cam and as a result of the coating agent in the coating agent suction space is gently extruded, with the result that a higher position coat surface can be obtained.

According to another aspect of the invention, the die unit is disposed in pair so as to oppose the substrate and the resulting one pair of die units are so constructed as to coat a coating agent on both surfaces of the substrate.

According to this construction, the intermittent coating to the conveyed substrate in the direction of the conveyance thereof can be executed to both surfaces simultaneously by the set of die units disposed on both sides of the substrate and this can contribute by enhancing the productivity.

In order to achieve the above object, according to the another aspect of the invention, there is provided an intermittent coating system comprising a die unit for coating a coating agent on a surface of a substrate that is being conveyed, which die unit is disposed by being located closely to the surface of the substrate, the die unit being equipped with a coating agent supply flow path whose delivery point is open toward the surface of the substrate and being provided with an elastic plate constituting part of a flow path wall at a midway position of the coating agent supply flow path, which elastic plate is displaceable between its coating agent supply form for supplying the coating agent on the surface of the substrate and its coating agent supply interrupt form of forming a coating agent suction space communicating with the coating agent supply flow path in a state of its being displaced to the coating agent supply form in the direction of its being moved away from the coating agent supply flow path to thereby dwell the supply of the coating agent on the surface of the substrate.

According to the coating system having this construction, when the flexible plate takes its coating agent supply form, the coating agent flowing through the coating agent supply flow path is delivered from the delivery port and is supplied on the substrate and thus coated thereon. On the other hand, when the elastic plate is in its coating agent supply interrupt form wherein the elastic plate is displaced in the direction of its being moved away from the coating agent supply flow path to thereby form the coating agent suction space, the coating agent flowing through the coating agent supply flow path is drawn into the coating agent suction space and does not flow into the delivery port and the supply thereof on the substrate is dwelled. By executing the supply of the coating agent on the substrate and the interrupt of this supply through the reciprocating deformation movement of the elastic plate made in this way, the substrate that is being conveyed has the coating agent intermittently coated thereon in the direction of the conveyance thereof, whereby the intermittent coating is performed.

Namely, the supply of the coating agent on the substrate and the interrupt of this supply for executing the intermittent coating are executed by drawing the coating agent in the vicinity of the delivery port into the coating agent suction space formed by the reciprocating deformation movement of the elastic plate. And therefore the coating drips from the delivery port and the buildups of the coat film at the time of starting the formation of the coated parts do not occur, with the result that a smooth high precision coat surface is obtained and the time lag of the coating speed does not also occur, whereby the productivity is enhanced. Also, since the system is made into a structure wherein the elastic plate is reciprocatingly moved by its deformation, it is also not necessary to perform high precision machining to such an extent as to make it difficult to manufacture the system.

According to another aspect of the invention, the elastic plate is fixed at its peripheral edge to the die unit and is connected at its central part to a piston member that is movable in the direction of its being moved toward or away from the coating agent supply flow path.

According to this construction, through the movement of the piston member made in the direction of its being moved toward or away from the coating agent supply flow path, in a state where the elastic plate has its peripheral edge fixed to the die unit, the elastic plate is displaced between its coating agent supply form and its coating agent supply interrupt form wherein the central part thereof is disposed to this coating agent supply form in the direction in which it is moved away from the coating agent supply flow path.

According to another respect of the invention, the piston member is moved by being urged in the direction of its being moved away from the coating agent supply flow path by a spring and, on the other hand, is moved toward the coating agent supply flow path side against the elastic force of the spring by a cam that rotates while being kept in sliding contact with the end part thereof that is on a side opposite to the side wherein the coating agent supply flow path is located.

According to this construction, in a state where the piston member has been pressed against the elastic force of the spring by the cam and moved to the coating agent supply flow path side, the elastic plate takes its coating agent supply form. At this time, the coating agent flowing through the coating agent supply flow path is supplied on the substrate through the delivery port. On the other hand, when the piston member is pressed by the spring and moved in the direction of its being moved away from the coating agent supply flow path, the elastic plate is also displaced in this direction, with the result that the coating agent suction space into which the coating agent is drawn is formed, whereby the supply of the coating agent on the substrate is dwelled.

Accordingly, the elastic plate is reliably reciprocatingly moved by its deformation by actions of the cam and spring, with the result that a high precision intermittent coating can be executed.

According to the another aspect of the invention, there is provided an intermittent coating method comprising the steps of disposing a die unit for coating a coating agent on a surface of a substrate that is being conveyed at a position close to the surface of the substrate, the die unit being equipped with a coating agent supply flow path whose delivery port is open toward the surface of the substrate and being provided with an elastic plate constituting part of a flow path wall at a midway position of the coating agent supply flow path, supplying the coating agent on the surface of the substrate with the elastic plate being made almost planar while, on the other hand, interrupting the supply of the coating agent on the surface of the substrate by displacing the elastic plate to the planar state thereof in the direction in which the elastic plate is moved away from the coating agent supply flow path and thereby forming a coating agent suction space communicating with the coating agent supply flow path and thereby drawing the coating agent into this coating agent draw-in space, and alternately performing the coating agent supply process and the coating agent supply dwelling process repeatedly to thereby form intermittently coated parts wherein the coating agent is coated on the surface of the substrate.

According to this coating method, through the reciprocating deformation movement of the elastic plate, the supply of the coating agent on the substrate and the interrupt of this supply are performed, whereby the coating agent is intermittently coated on the substrate in the direction of the conveyance thereof, namely, the intermittent coating process is executed. Thus, identical effects as those attainable with the use of the coating system are obtained.

According to another aspect of the invention, the end part on a delivery port side of the coating agent drawn into the coating agent suction space is retracted into the coating agent supply flow path by a prescribed distance from a end of a delivery port.

According to this coating method, at the time when the supply of the coating agent is dwelled, the coating agent is brought to a state where the coating agent is retracted from the end of the delivery port into the coating agent supply flow path by a prescribed distance and therefore the drips of the coating agent from the end of the delivery part can be avoided, with the result that a higher precision intermittent coating can be performed.

According to another aspect of the invention, the coating agent is supplied successively in a fixed amount to the coating agent supply flow path by coating agent supply means and the coating agent supply means supplies as the amount of supply the coating agent whose amount is one that has been obtained by subtracting the amount of the coating agent drawn into the coating agent suction space from the amount of supply that is necessary when forming a predetermined thickness of the coat film on the coated part.

According to this coated method, when discharging the coating event from the delivery port on the substrate, the coating agent is delivered from the delivery port in an amount that is obtained by adding the amount thereof drawn into the coating agent suction space to the amount thereof supplied from the coating agent supply means. Therefore, by setting the amount of the coating agent supplied from the coating agent supply means at a value obtained by subtracting therefrom the amount thereof drawn into the coating agent suction space, it is possible to obtain a predetermined coat film thickness.

BRIEF DESCRIPTION OF THE ACCOMPANYING DRAWINGS

The above and further objects and novel features of the invention will more fully appear from the following detailed description when the same is read in conjunction with the accompanying drawings, in which.

DETAILED DESCRIPTION OF THE PREFERRED EMBODIMENTS

Figure 1:
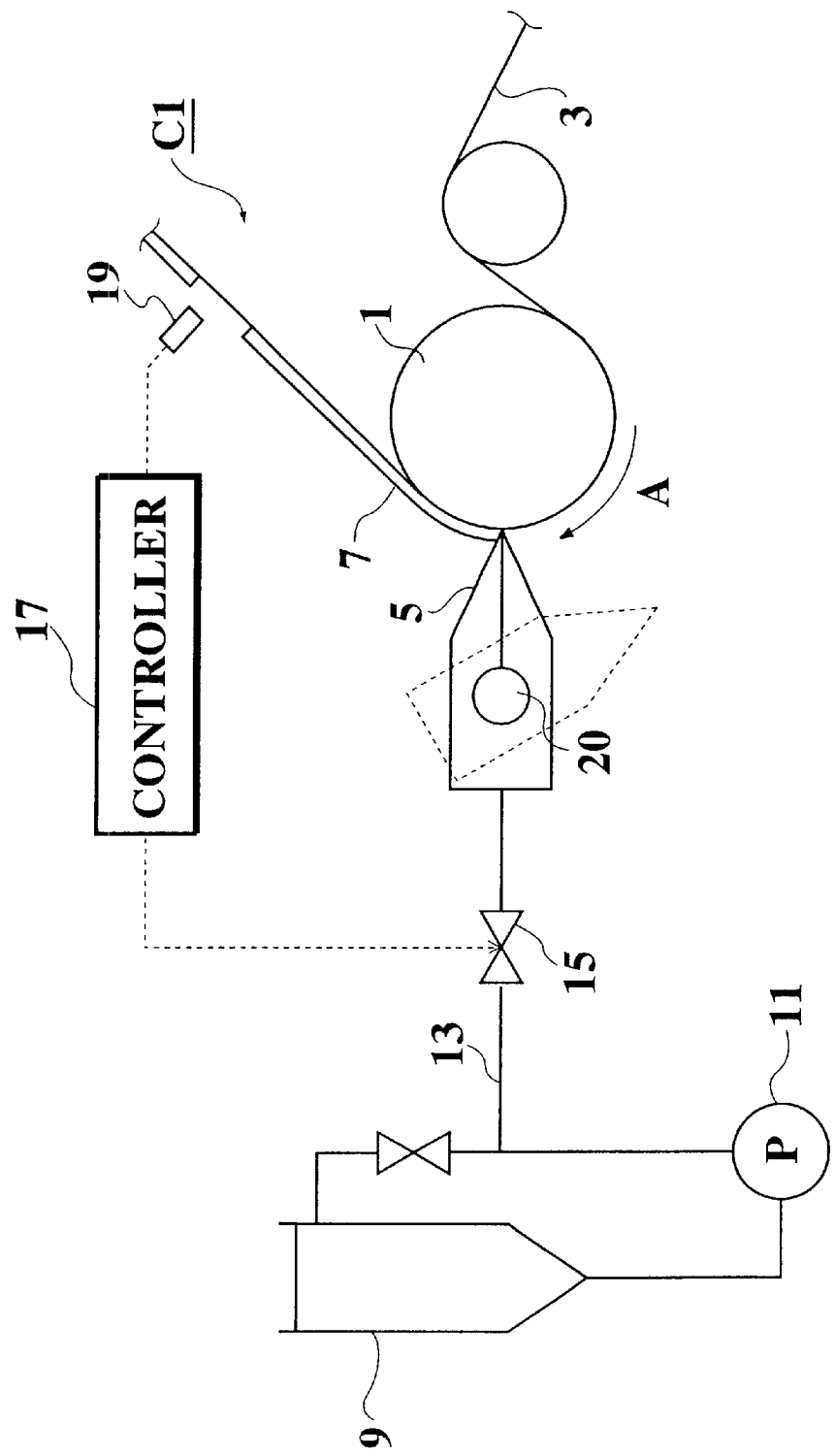
FIG. 1 is a constructional view illustrating an entire construction of a conventional coating system.
Figure 2:
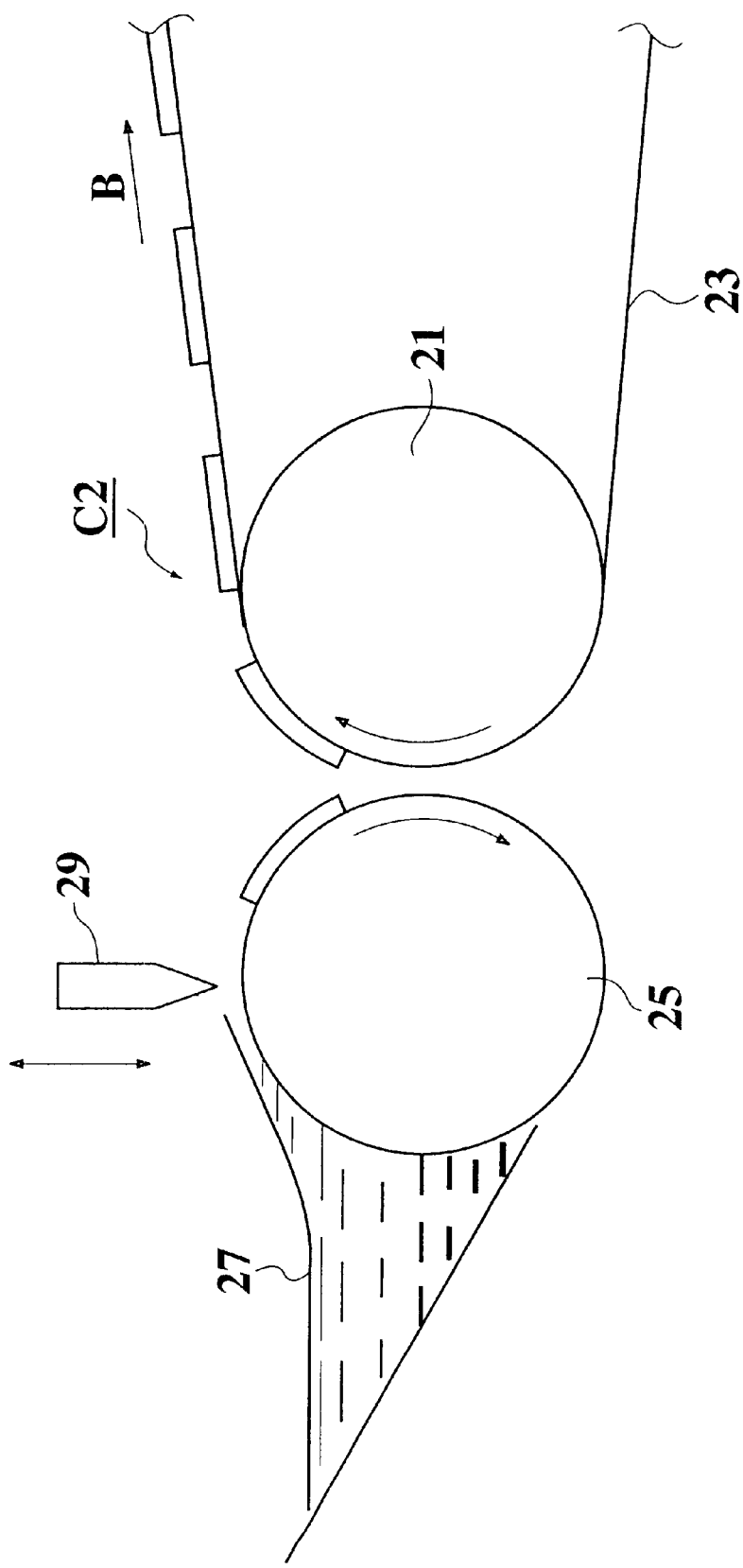
FIG. 2 is a schematic constructional view illustrating another conventional coating system.

There will be detailed below the preferred embodiments of the invention with reference to the accompanying drawings. Like members are designated by like reference characters.

Figure 3:
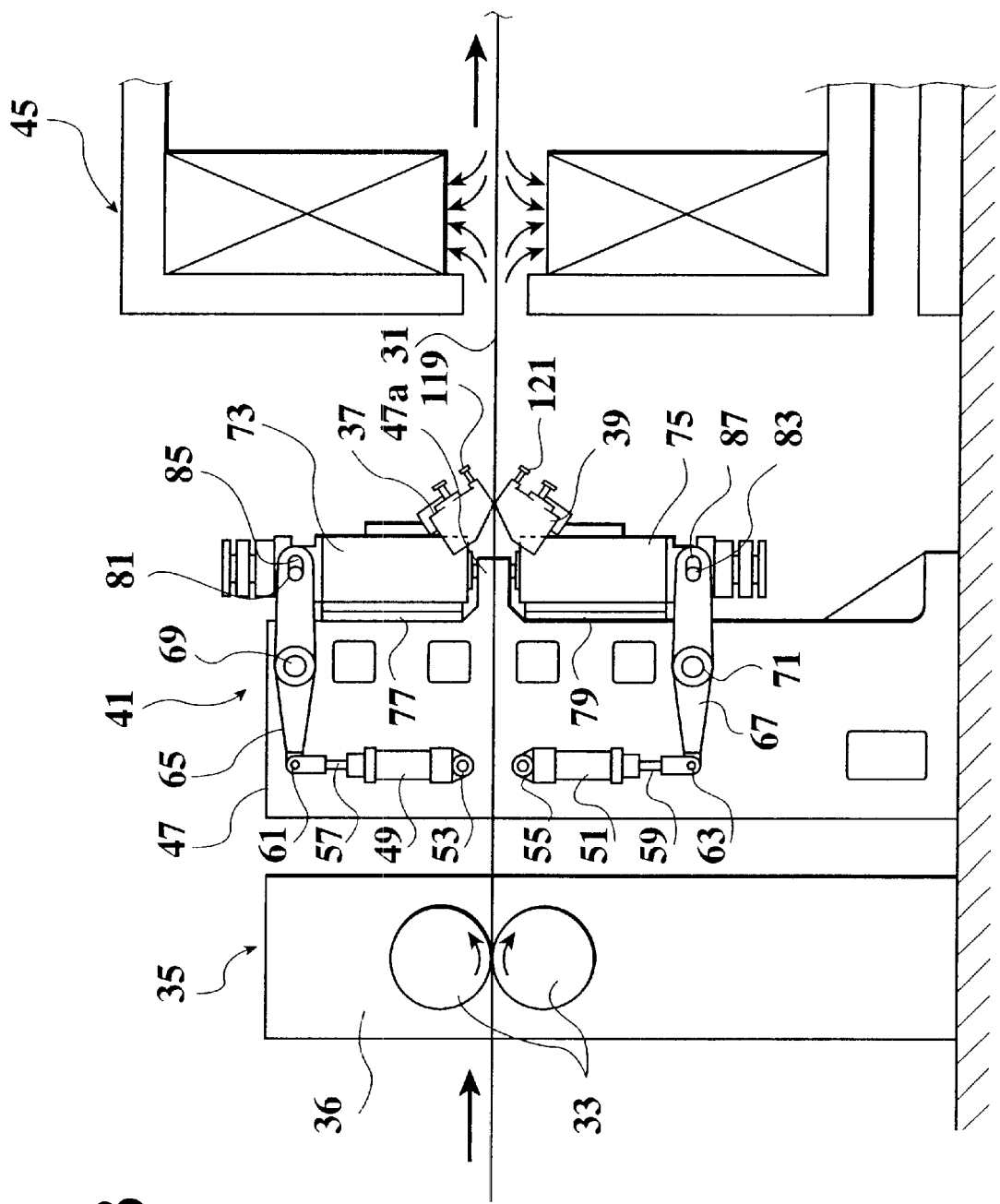
FIG. 3 is a front view illustrating an entire construction of a coating system according to an embodiment of the invention.

FIG. 3 is a front view illustrating an entire construction of a coating system according to an embodiment of the invention. A substrate 31 here in this embodiment is a substrate of electrode cell in a secondary battery of lithium ions, which comprises an aluminum foil or copper foil. This substrate 31 is conveyed from the left side toward the right side in this figure so as to have a coating agent, which is a composite material of electrode, coated on both surfaces thereof.

The substrate 31 is conveyed, from the left to the right in the figure, by a feed unit 35 equipped with a pair of feed rollers 33. On the frontward side in the conveyance direction of the feed unit 35 there is disposed a coating unit 41 that has a pair of upper/lower die units 37, 39 which are die units for coating the coating agent on the surfaces of the substrate 31. Further, on the frontward side in the conveyance direction of the coating unit 41 there is disposed a drying unit 45 for carrying the coating agent that has been coated. And at both end parts as viewed in the width direction of the substrate 31 there are non-coated parts which serve concurrently as guides therefor.

The feed unit 35 includes basic supports 36 which are disposed in pair, respectively, on left and right sides in the conveyance direction of the substrate 31. And the both end parts of feed rollers 33 are supported by the basic supports 36, respectively. The coating unit 41 also includes basic supports 47 which are disposed in pair, respectively, on left and right sides in the conveyance direction of the substrate 31. On mutually opposing sides of the basic supports 47 there are mounted, respectively, a pair of upper/lower cylinders 49, 51 which are paired with each other with the substrate 31 as a border. Accordingly, FIG. 3 is a front view taken in a state where there is omitted one basic support 47 located on this side in the figure.

The respective cylinders 49, 51 are rotatably supported, at the end parts thereof on the substrate 31 side, by supporting shafts 53, 55. And on the ends of piston rods 57, 59 protruding toward the sides opposite to the sides where these supporting shafts are located there are rotatably supported the ends on one side of oscillating levers 65, 67 through supporting pins 61, 63, respectively.

The oscillating levers 65, 67 are rotatably supported, at their substantially central parts in their longitudinal directions, by the basic support 47 through oscillating/supporting shafts 69, 71. On the ends on the other side of the oscillating levers 65, 67 there are provided elongate holes 85, 87 and, on mutually opposing sides thereof, there are mounted positioning sliders 73, 75 that are equipped with the upper/lower die units 37, 39, respectively. The positioning sliders 73, 75 are used to locate the positioning of the upper/lower die units 37, 39 to the substrate 31 and are vertically slidable to the side surface of the basic support 47 through guide parts 77, 79. The positioning sliders 73, 75 are connected to the oscillating levers 65, 67 by insertion of connecting pins 81, 83 provided in the vicinity of the end parts thereof located on the sides opposite to the sides wherein the upper/lower die units 37, 39 are provided into the elongate holes 85, 87 provided in the oscillating levers 65, 67.

Figure 4:
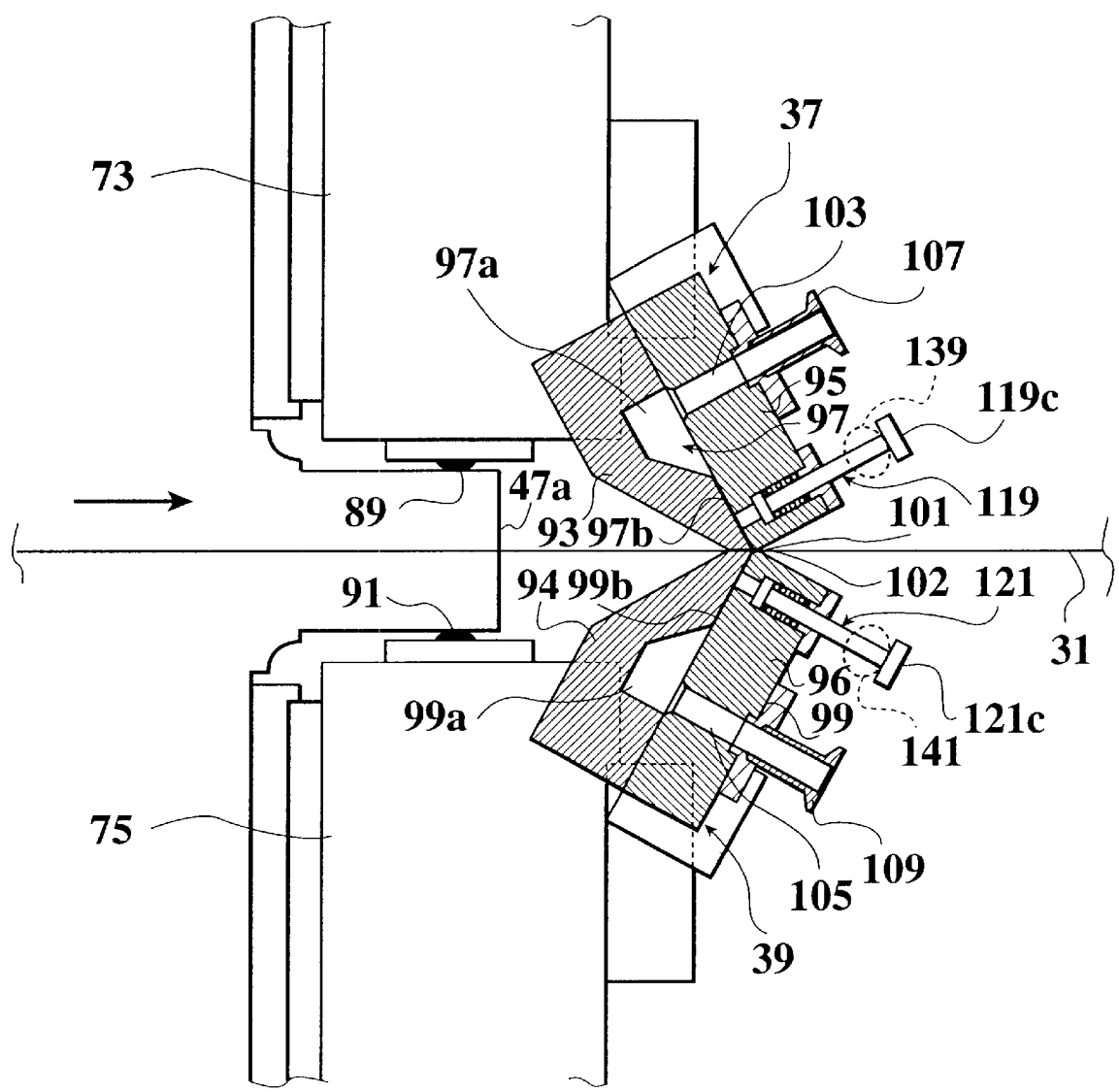
FIG. 4 is an enlarged view illustrating a main part of the coating system of FIG. 3 whose upper and lower die unit parts are illustrated in section.

Between the upper and lower positioning sliders 73, 75 there is formed a positioning protrusion 47a that protrudes from a side surface of the basic support 47 on the frontward side of the substrate 31 as viewed in the conveyance direction thereof forwardly in this conveyance direction. On the other hand, on mutually opposing surfaces of the positioning sliders 73, 75, as illustrated in FIG. 4 in which the relevant parts are enlarged and the upper/lower die units 37, 39 are illustrated in section, there are provided positioning convex parts 89, 91 for positioning the upper/lower die units 37, 39 to the substrate 31, respectively, in such a way that these convex parts 89, 91 abut respectively on upper/lower surfaces of the protrusion 47a. The positioning convex parts 89, 91 are so arranged that the amounts thereof protruded from the positioning sides sliders 73, 75 toward the protrusion 47a can be changed by mechanisms such as built-in ball screws and this enables fine positioning adjustments of the upper/lower die units 37, 39.

The upper die unit 37 is so supported as to be clamped and fixed between the positioning sliders 73 that are provided respectively on the paired left and right basic supports 47 and the lower die unit 39 is so supported as to be clamped and fixed between the positioning sliders 75 that are provided respectively on the paired left and right basic supports 47.

The upper/lower die units 37, 39 are formed with coating agent supply flow paths 97, 99 at the surfaces of the connections between first blocks 93, 94 and second blocks 95, 96 that are respectively connected with each other. The coating agent supply flow paths 97, 99 are composed of volumetric parts 97a, 99a that are formed as concave parts on the first blocks 93, 94 sides and flow path parts 97b, 99b one ends of which are communicating with the volumetric parts 97a, 99a and the other ends of which are opposed to the surfaces of the substrate 31 and open as delivery ports 101, 102, respectively, and these coating agent supply flow parts 97, 99 are provided over a substantially entire width of the substrate 31. Each of the first and second blocks 93, 95 and each of the first and second blocks 94, 96 have end plates not illustrated mounted on their both ends as viewed in their longitudinal directions that are perpendicular to the sheet surface of FIG. 4, whereby both ends of each of the coating agent supply flow paths 97, 99 are respectively closed.

The second blocks 95, 96 are respectively formed with coating agent entrance flow paths 103, 105 one ends of which are communicating with the volumetric parts 97a, 99a and the other ends of which are opened to the outside. These other ends thereof are communicating with passages within mouthpieces 107, 109 mounted respectively on the second blocks 95, 96. To these mouthpieces 107, 109 there are connected coating agent supply pipes not illustrated, whereby the coating agents are supplied to the upper/lower die units 37, 39 by actions of pumps not illustrated.

Figure 5:
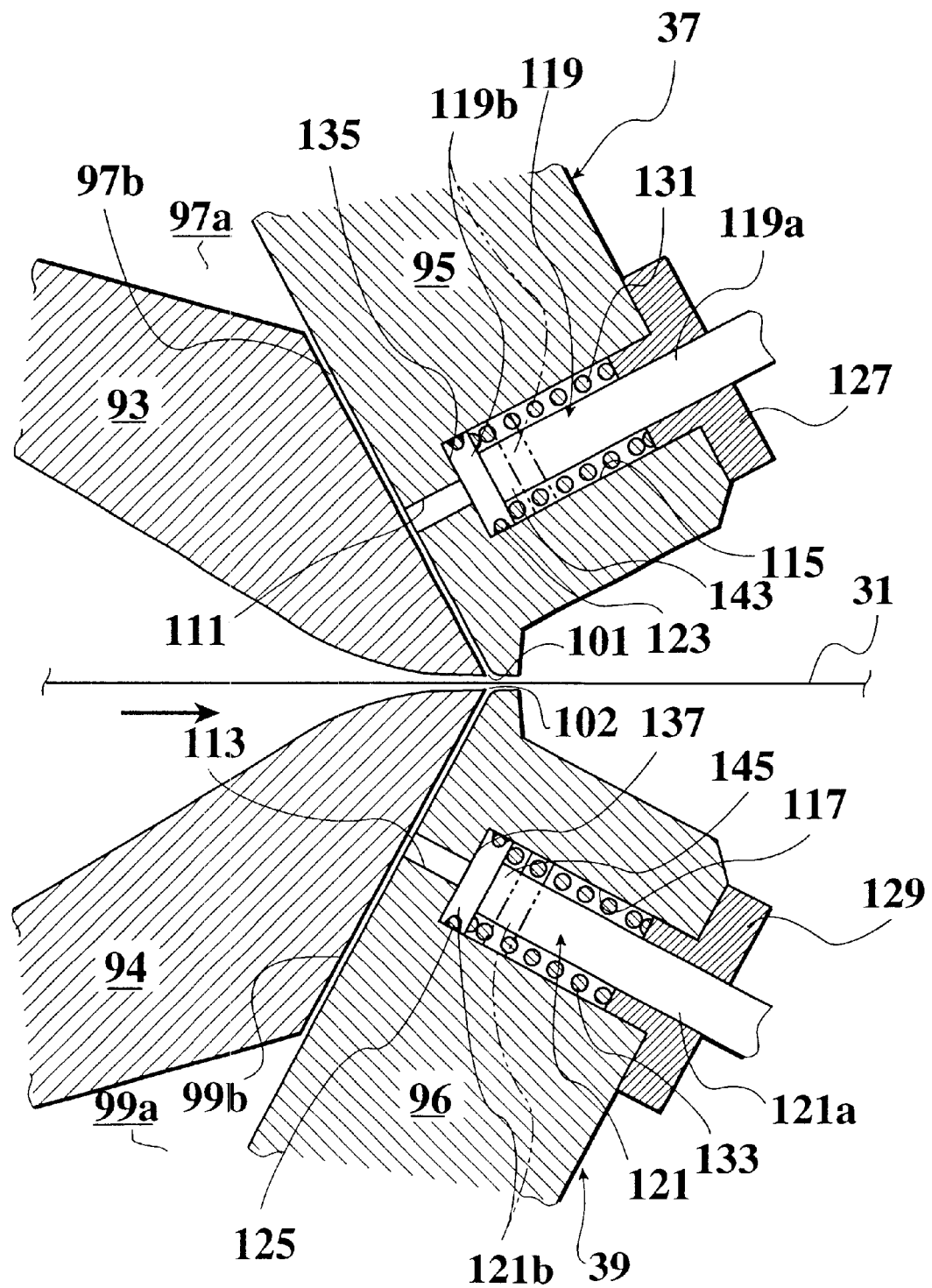
FIG. 5 is an enlarged view illustrating a main part of FIG. 4.

At the positions of the second blocks 95, 96 opposed to the flow paths 97b, 99b, as illustrated in FIG. 5 in which the relevant parts are illustrated on an enlarged scale, there are formed connecting holes 111, 113 one ends of which are communicating with the flow path parts 97b, 99b and the other ends of which are communicating with accumulation piece insertion holes 115, 117 whose diameters are larger than the diameters of the connecting holes 111, 113. Accumulation pieces 119, 121 that are movable in the directions of their being moved toward or away from the flow path parts 97a, 99b are inserted into these accumulation piece insertion holes 115, 117.

The accumulation pieces 119, 121 include rod parts 119a, 121a and slide parts 119b, 121b, the slide parts 119b, 121a being installed on ends of the rod parts 119a, 121a. Seal members 123, 125 are provided at the peripheral parts of the slide parts 119b, 121b to thereby provide seals between the connecting holes 111, 113 sides and the accumulation piece insertion holes 115, 117 sides. Also, springs 131, 133 are disposed between the slide parts 119b, 121b and guide bosses 127, 129 mounted at the positions at which the accumulation piece insertion holes 115, 117 are open to the outside. By these springs 131, 133, the accumulation pieces 119, 121 are urged toward the connecting holes 111, 113 sides, whereby the slide parts 119b, 121b abut on stepped parts 135, 137 that are located between the connecting holes 111, 113 and the accumulation piece insertion holes 115, 117, with the result that the movements of the accumulation pieces 119, 121 toward the flow path parts 97b, 99b slides are stopped.

On the end parts of the accumulation pieces 119, 121 that protrude from the second blocks 95, 96 to the outside, there are provided flanges 119c, 121c as illustrated in FIG. 4. Cams 139, 141 are disposed on the surfaces on the rod parts 119a, 120a sides of these flanges 119c, 121c. Through the rotations of the cams 139, 141, the accumulation pieces 119, 121 are reciprocatingly moved between the positions (coating agent supply position) illustrated in FIGS. 4 and 5 and the positions (coating agent supply dwell position) illustrated by two-dot chain lines in FIG. 5. When the accumulation pieces 119, 121 have been brought to the two-dot chain line positions, coating agent suction spaces 143, 145 are formed between the connecting holes 111, 113 and the slide parts 119b, 121b of the accumulation pieces 119, 121.

According to the coating system having the construction, by actions of cylinders 49, 51 the positioning sliders 73, 75 slide in the direction of their moving toward each other to thereby cause the positioning convex parts 89, 91 at the ends thereof to abut on the protrusion 47a on the basic support 47 side. As a result of this, the end surfaces of the upper and lower die units 37, 39 at which the delivery ports 101, 102 are formed are positioned at the locations spaced by small gaps (e.g. 0.2 mm) corresponding to a coat thickness, from the surfaces of the substrate 31.

In this state, in order to coat the coating agents to the substrate 31 kept in conveyance, first, the coating agents that have been supplied from the coating agent supply pipes through the drives of the pumps not illustrated pass through the coating agent entrance passages 103, 105 of the upper and lower die units 37, 39 and flow into the volumetric parts 97a, 99a of the coating agent supply flow paths 97, 99. And these coating agents pass through the flow path parts 97b, 99b and are delivered from the delivery ports 101, 102 toward the substrate 31.

Figure 6A:
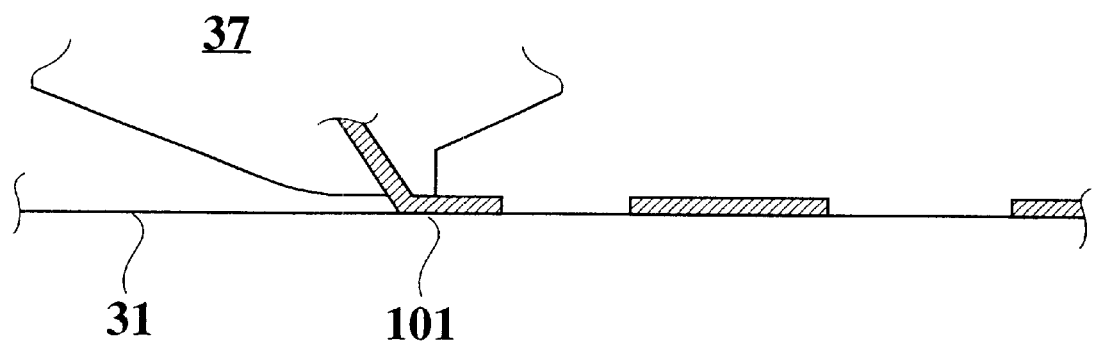
FIG. 6A is a typical view illustrating a state where a coating agent is being delivered from a delivery port of the coating system illustrated in FIG. 3

In a state where the coating agents are delivered from the delivery ports 101, 102, the accumulation pieces 119, 121 are kept in a state where the slide parts 119b, 121b are in abutment with the stepped parts 135, 137. The coating agents at this time are kept entered also into the connecting holes 111, 113, whereby the coating agents are filled in the entire coating agents supply flow paths 97, 99 including the delivery ports 101, 102. FIG. 6A is a typical view illustrating the operation of only the upper die unit side at this time.

When the cams 139, 141 are rotated at a present angle from this state, the accumulation pieces 119, 121 are moved against the springs 131, 135 in the direction of their moving away from the connecting holes 111, 113, whereby the slide parts 119b, 121b are brought to the positions indicated by the two-dot chain lines in FIG. 5. As a result, the coating agent suction spaces 143, 145 are formed between the slide parts 119b, 121b and the connecting holes 111, 113.

Figure 6B:
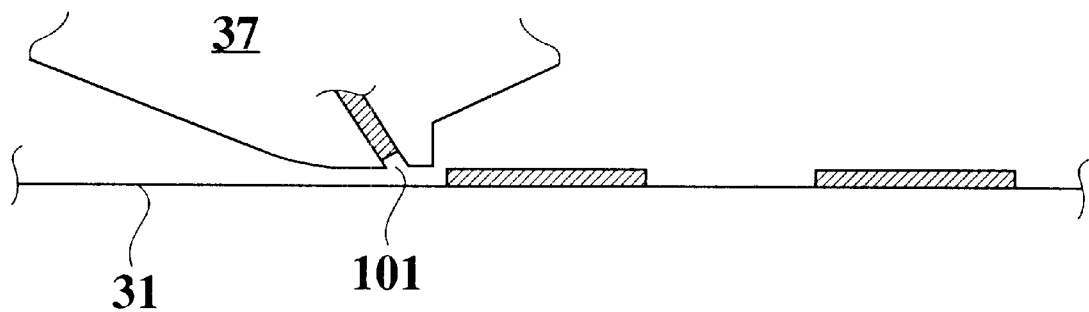
FIG. 6B is a typical view illustrating a state where the delivery of the coating agent is being dwelled.

By the formation of the coating agent suction spaces 143, 145, the coating agents that are being supplied successively to the coating agent supply flow paths 97, 99 are drawn from the flow path parts 97b, 99b into the coating agent suction spaces 143, 145 through the connecting holes 111, 113. As a result, the coating agents that are located in the vicinity of the delivery ports 101, 102 are retracted into the coating agent supply flow paths 97, 99 as illustrated in FIG. 6B, whereby the delivers of the coating agents from the delivery ports 101, 102 are dwelled. Whereby, non-coated parts wherein no coating agents are coated are formed on the surfaces of the substrate 31.

When the cams 131, 141 are further rotated at a present angle from the state where the coating agent suction spaces 143, 145 are formed, the accumulation pieces 119, 121 are moved in the direction of their moving toward the connecting holes 111, 113 and the slide parts 119b, 121b abut on the stepped parts 135, 137. As a result, the coating agents within the coating agent suction spaces 143, 145 are extruded therefrom and these coating agents are again entered into the flow path parts 97b, 99b in the vicinity of the delivery ports 101, 102. Even during this period of time, also, the coating agents are being supplied successively from the outside into the coating agent supply flow paths 97, 99. For this reason, the coating agents are delivered from the delivery ports 101, 102 and are coated on the surfaces of the substrate 31, with the result that the coated parts are formed thereon.

Figure 7A:
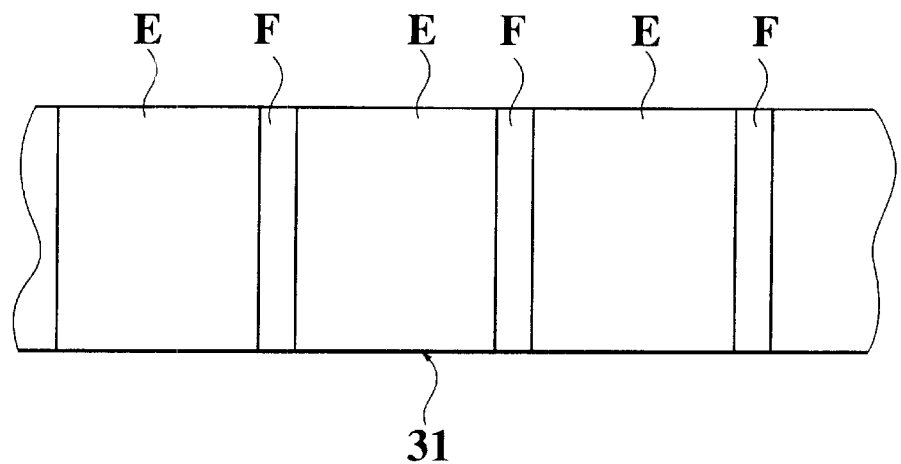
FIG. 7A is a plan view illustrating a substrate on which the coating agent is coated by action of the coating system illustrated in FIG. 3.

Accordingly, by reciprocating moving the accumulation pieces 119, 121 within the accumulation piece insertion holes 115, 117 repeatedly through the successive rotations of the cams 139, 141 and alternating displacing the accumulation pieces 119, 121 to the coating agent supply positions and the coating agent supply dwell positions, as illustrated in FIGS. 7A and &B, the intermittent coating wherein the coated parts E and the non-coated parts F are alternately formed can be performed to both surfaces of the substrate 31 simultaneously, with the result that the productivity is enhanced.

Figure 7B:
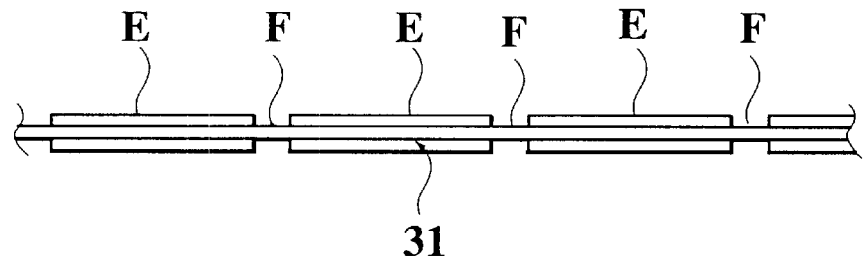
FIG. 7B is a side view thereof and FIG. 7C is a view illustrating a different intermittent coat pattern.
Figure 7C:
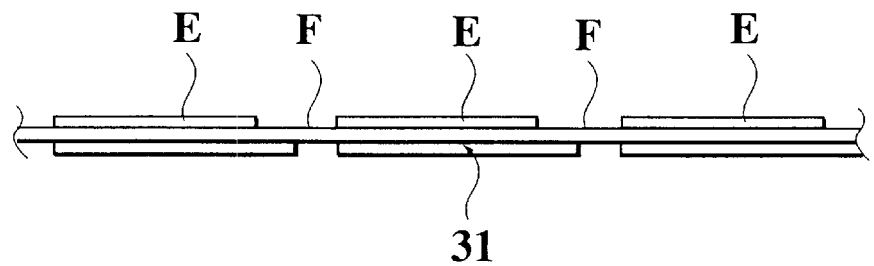

It is to be noted that, although in FIG. 7B the intermittent coat patterns on both surfaces of the substrate 31 are the same in configuration, it is also possible to change the patterns of the cams 139, 141 of the upper and lower die units 37, 39 between these cams 139, 141 and thereby change the forms wherein the accumulation pieces 119, 121 are moved and thereby make different the intermittent coat patterns between the both surfaces as illustrated in, for example, FIG. 7C.

According to the coating system, when forming, the non-coated parts F, the coating agents within the flow path parts 97b, 99b are drawn into the coating agent suction spaces 143, 145 sides and as a result the coating agents almost cease to exist in the vicinity of the delivery ports 101, 102. As a result of this, the occurrence of the coating agent drips from the delivery ports 101, 102 due to the residual pressure in the flow path parts 97b, 99b are avoided and, after the formations of the non-coated parts F, the occurrences of the buildups of the coat surfaces at the time of starting the formations of the coated parts E are also avoided, with the result that smooth high precision coat surfaces are obtained.

Further, since the intermittent coatings are performed through the rotations of the cams 139, 141, no time lag of the coating speeds occurs with the result that highly efficient intermittent coatings can be performed. Further, since the system is made up into a structure wherein the accumulation pieces 119, 121 are reciprocatingly moved by the drives of the cams 139, 141, it is not necessary to perform such high precision operations as would make it difficult to manufacture the system.

It is to be noted that the positions at which the accumulation pieces 119, 121 are provided are made to close to the delivery ports 101, 102 as possible. As a result, the distances between the connecting holes 111, 113 and the delivery 101, 102 become short with the result that it is possible to reliably retract the coating agents near the delivery ports 101, 102 into the coating agent suction spaces 143, 145 and this makes it possible to obtain a higher quality of coat surfaces.

Figure 8:
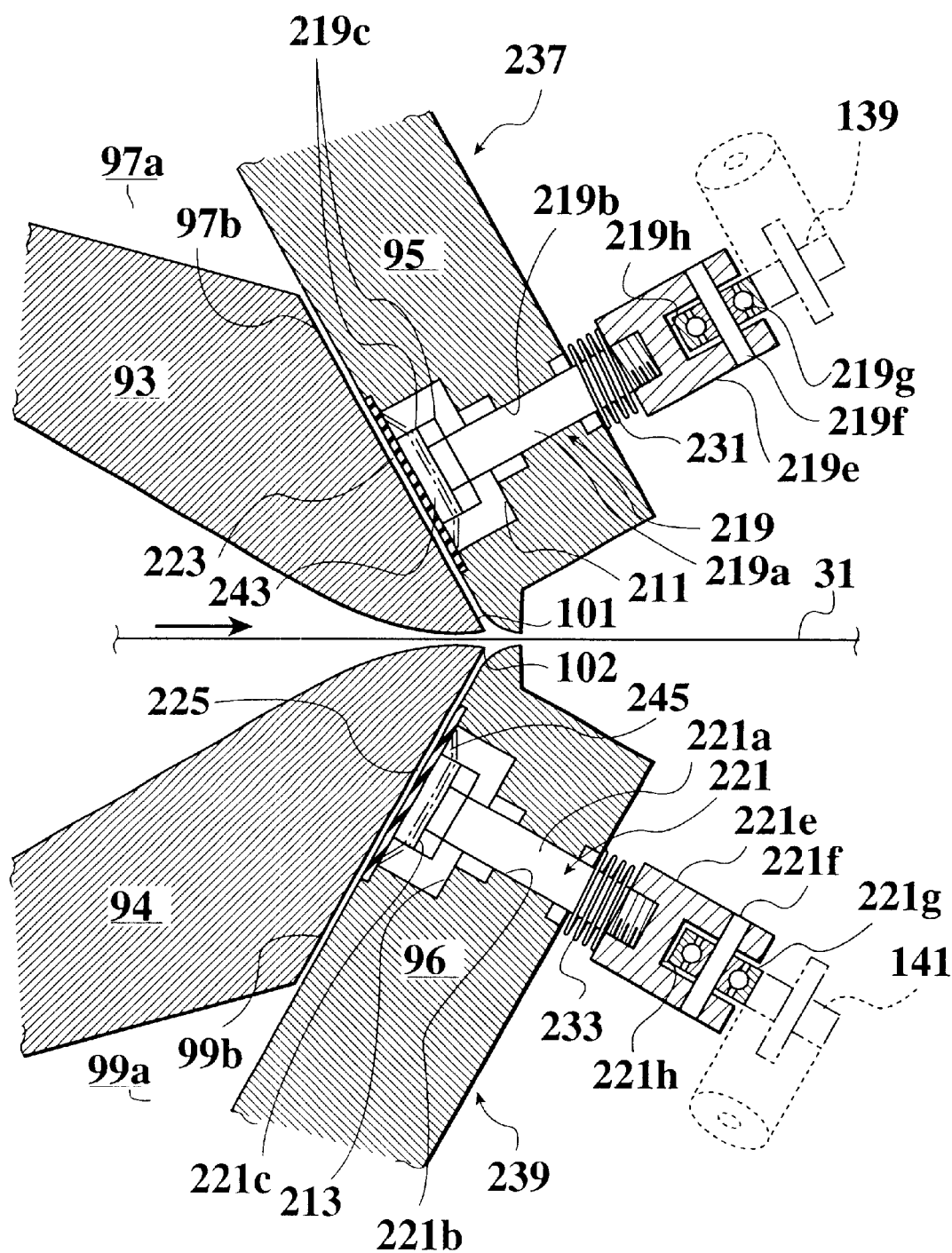
FIG. 8 is a sectional view, corresponding to FIG. 5, illustrating a coating system according to another embodiment of the invention.

FIG. 8 is a sectional view corresponding to the preceding FIG. 5, illustrating another embodiment of the invention. In upper/lower die units 237, 239, there are provided accumulation pieces 219, 221 in a state where these accumulation pieces are slidable and unrotatable within insertion holes 219b, 221b. The ends of rod parts 219a, 221a of the accumulation pieces 219, 221 are screwed to flanges 219c, 221c and the base ends thereof are also screwed to bosses 219e, 221e.

On the flow path parts 97b, 99b sides of the insertion holes 219b, 221b there are formed enlarged concave parts 211, 213 in which the flanges 219c, 221c are accommodated. To the flanges 219c, 221c there are bonded rubber-made plate-like seal members 223, 225, whose diameters are larger than the diameters of the flanges 219c, 221c. Peripheral edge parts of the seal members 223, 225 are fixed to the peripheral edges of opening parts of the enlarged concave parts 211, 213.

Concave parts 219h, 221h are formed in the end parts of the bosses 219e, 221e on sides opposite to the sides wherein the accumulation pieces 219, 221 are located. Bearings 219g, 221g that are accommodated in these concave parts 219h, 221h are supported by shafts 219f, 221f that are inserted through and fixed to the bosses 219e, 221e.

Spring 231, 233 are disposed between the upper and lower die units 237, 239 and the bosses 219e, 221e, respectively, whereby the bosses 219e, 221e are pressed toward sides opposite to the sides wherein the flow paths 97b, 99b are located while, on the other hand, cams 139, 141 are disposed at the positions where the contacts thereof with outside diameter surfaces of the bearings 219g, 221g are made.

In the construction of FIG. 8, when the cams 139, 141 are in the state illustrated in FIG. 8, the springs 231, 233 are pressed by the cams 139, 141 through the bosses 219e, 221e and are thereby flexed. At this time, the seal members 223, 225 are kept at their solid line positions together with the flanges 219c, 221c while being maintained at their substantially planar plate-like state. At this time, the coating agents that flow through the flow parts 97b, 99b are delivered from the delivery ports 101, 102 as they are, whereby coated parts are formed on the surfaces of the substrate 31.

When the cams 139, 141 are rotated at a preset angle from the states of FIG. 8, the bosses 219e, 221e are pressed by the springs 231, 233 and are speedily moved together with the accumulation pieces 219, 221 in the direction of their moving away from the flow path parts 97b, 99b. As a result, the seal members 223, 225 are pulled in this direction. Consequently, these seal members 223, 225 are deformed as indicated by two-dot chain lines, whereby coating agent suction spaces 243, 245 communicating with the flow path parts 97b, 99b are speedily formed.

As a result of the formation of the coating agent suction spaces 243, 245, the coating agents that are successfully supplied to the coating agent supply flow paths 97, 99 are drawn from the flow path parts 97b, 99b into the coating agent suction spaces 243, 245. As a result, the coating agents in the vicinity of the delivery ports 101, 102 are brought to the state where these coating agents are retracted into the interiors of the coating agent supply flow paths 97, 99 as previously illustrated in FIG. 6B, with the result that the delivers of the coating agents from the delivery ports 101, 102 are dwelled. As a result of this, on the surfaces of the substrate 31, there are formed non-coated parts wherein no coating agents are coated.

In this coating system of FIG. 8, also, when such non-coated parts F are formed, the coating agents within the flow path parts 97b, 99b are drawn into the coating agent suction spaces 243, 245 sides, with the result that the coating agents almost cease to exist in the vicinity of the delivery ports 101, 102. Therefore, there are avoided the occurrences of the coating agent drips from the delivery ports 101, 102 due to the residual pressures in the flow path parts 97b, 99b. Also, after the formation of the non-coated parts, when starting the formation of the coated parts, the accumulation pieces 219, 221 are gently pressed by the cams 139, 141, whereby the seal members 223, 225 are returned from their two-dot chain line positions to their solid line positions. As a result of this, the coating agents within the coating agent suction spaces 243, 245, are thereby gently extruded into the flow path parts 97b, 99b and therefore the occurrences of the buildups of the coat surfaces are reliably avoided. Thus, smoother high precision coat surfaces are obtained.

Incidentally, the mechanisms for reciprocatingly moving the accumulation pieces 119, 121 and 219, 221 are not limited to those which use the driving operations performed by the cams 139, 141.

Figure 9:
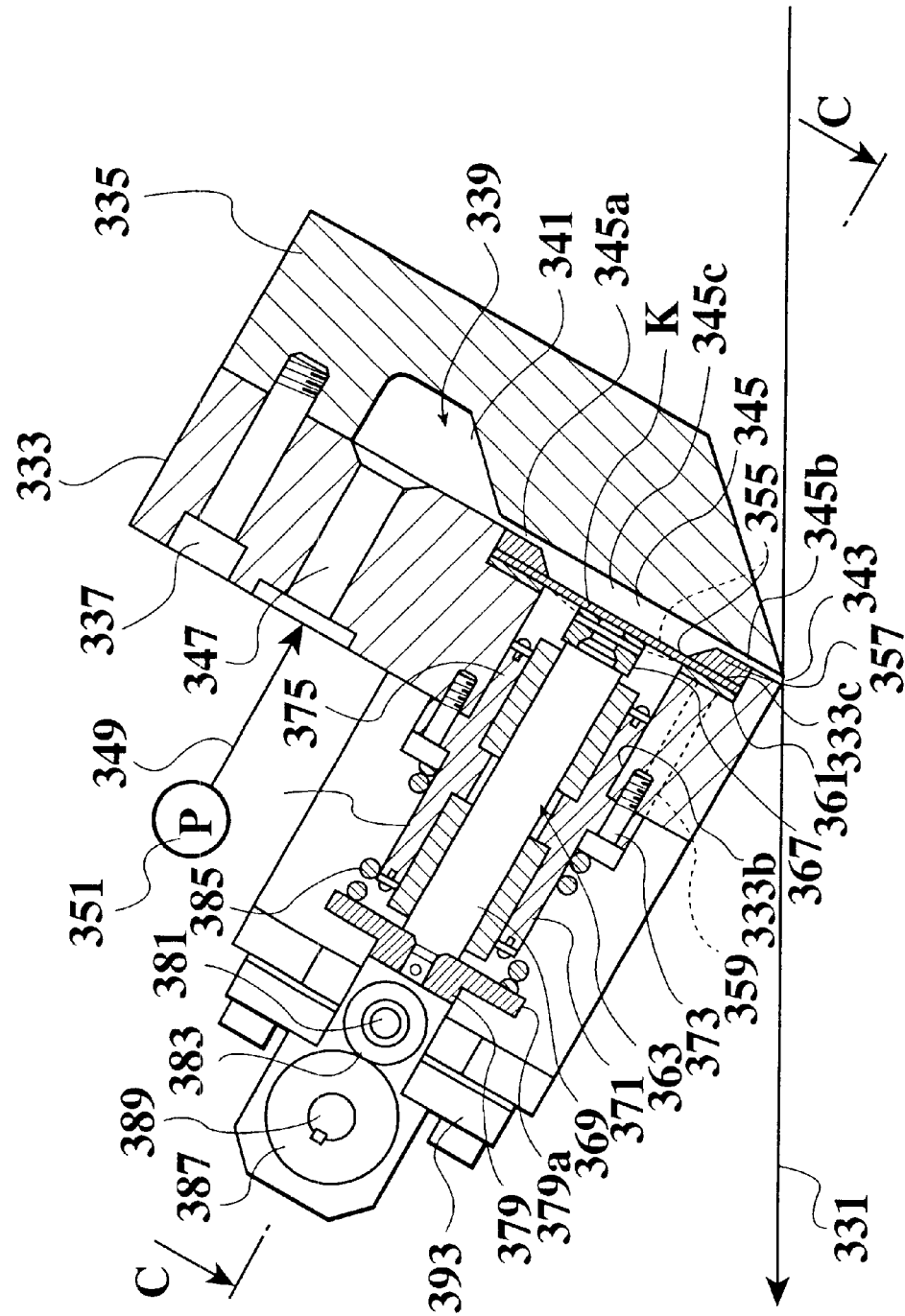
FIG. 9 is a front sectional view illustrating a coating system according to still another embodiment of the invention.
Figure 10:
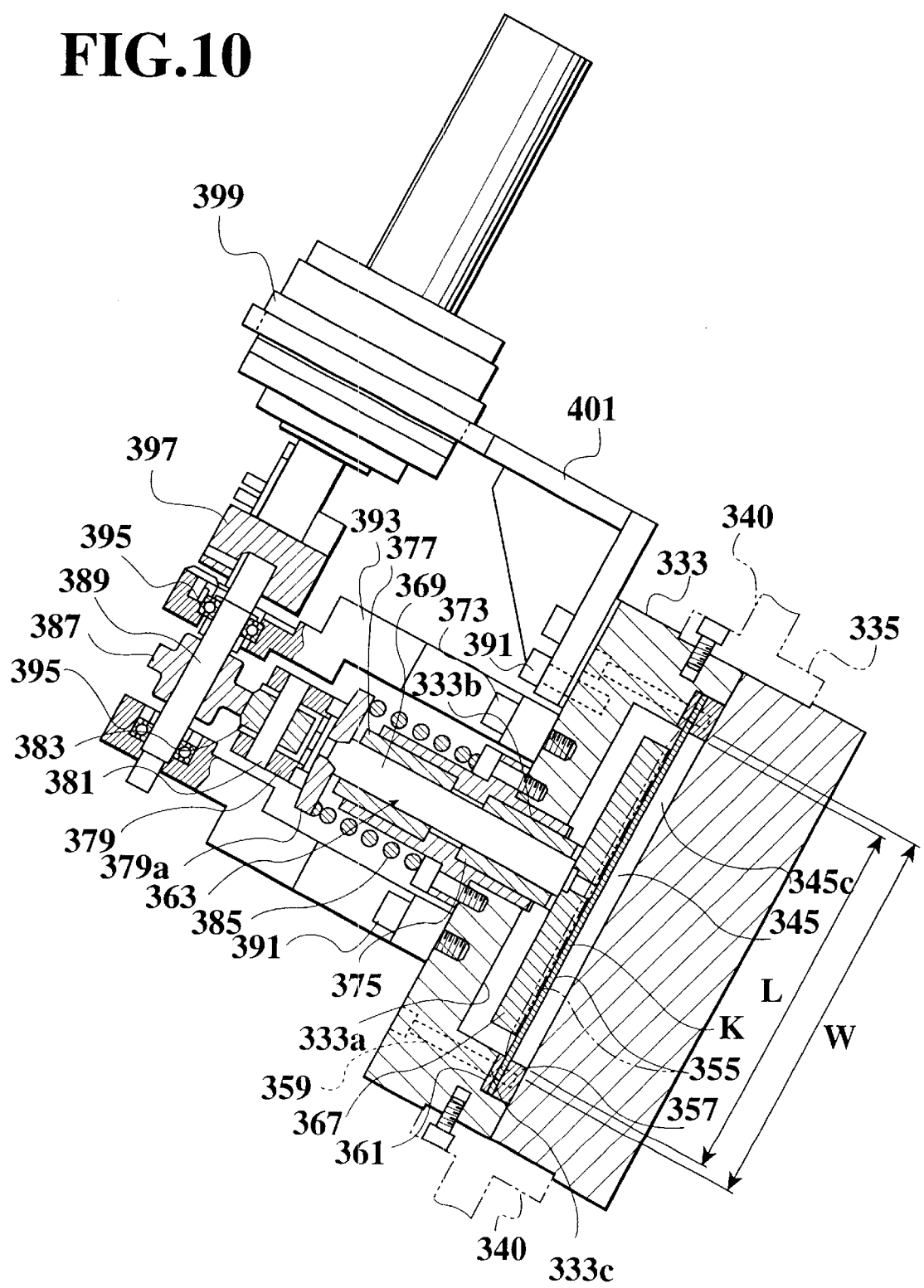
FIG. 10 is a sectional view taken along a line C—C of FIG. 9.

FIG. 9 is a front sectional view of a coating system according to still another embodiment of the invention and FIG. 10 is a sectional view taken along a line C—C of FIG. 9. A substrate 331 here in this embodiment is a substrate of electrode cell in a secondary battery of lithium ions that comprises an aluminum foil or copper foil. The substrate 331 is conveyed while being kept in a horizontal state from the right toward the left in FIG. 9 so that the coating agent constituting a composite material of electrode may be coated on both surfaces thereof. It is to be noted that although here in this embodiment it is arranged to coat the coating agent on only an upper surfaces of the substrate 331 in FIG. 9, it may be also arranged to coat the coating agent on both surfaces of the substrate 331 by disposing similar constituent elements also on the underside thereof in such a way that the both constituent elements may be vertically symmetrical with each other.

A first block 333 and a second block 335 that constitute a die unit are fixed to each other by a bolt 337, whereby a coating agent supply flow path 339 is formed between these blocks 333 and 335. As illustrated in FIG. 10, the blocks 333, 335 are supported by support members 340 that are fixed to both side parts, respectively.

The coating agent supply flow path 339 has a volumetric part 341 which is formed as a concave part on the second block 335 side and a flow path part 345 one end of which is communicating with the volumetric part 341 and the other end of which is open as a delivery port 343 opposed to the surface of the substrate 331. As illustrated in FIG. 10, the width L of the flow path part 345 is made smaller than the width W of the substrate 331. Namely, the substrate 331 is made into a state where a central part thereof corresponding to the delivery port 343 has the coating agent coated thereon and both side edges thereof as viewed in the width direction have no coating agent coated thereon.

The first block 333 is formed with a coating agent entrance flow path 347 one end of which is communicating with the volumetric part 341 and the other end of which is open to the outside and connected to a pump 351 serving as coating agent supply means by way of a coating agent supply pipe 349. The pump 351 feeds the coating agent successively in a fixed amount into the coating agent supply flow path 339.

The flow path part 345 has a narrowed part 345a on the volumetric part 341 side, a narrowed part 345b on the delivery port 343 side and an enlarged part 345c that is formed between these two narrowed parts 345a and 345b. As illustrated in FIG. 10, in the first block 333 corresponding to the enlarged part 345c, there is formed a concave part 333a whose width is equal to the width L of flow path part 345 and, in a central part of the concave part 333a, there is formed a through-hole 333b that is communicating with the outside. An elastic plate 335 that constitutes part of the flow path wall of the coating agent supply flow path 339 and that comprises a thin stainless steel plate or Teflon (registered trademark) plate or the like is provided so as to close the opening on the second block 335 side of the concave part 333a. This elastic plate 355 is made into a configuration that conforms to the configuration of the enlarged part 345c.

A stepped part 333c is formed on the peripheral edge of the opening on the second block 335 side of the concave part 333a over an entire circumference thereof. By a frame member 357 that has been fitted to this stepped part 333c, the peripheral edge of the elastic plate 335 is retained and, by bolts 359 inserted into the first block 333 into the frame member 357, the elastic plate 355 is fixed. At this time, a packing 361 is disposed between the stepped part 333c and the elastic plate 355, whereby a seal is provided between these two elements.

Figure 11:
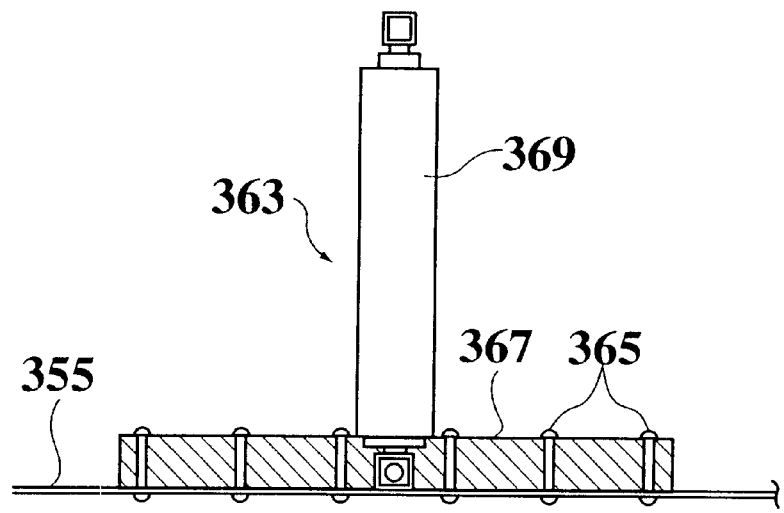
FIG. 11 is a front sectional view illustrating a flexible plate and a piston member that are used in the coating system of FIG. 9.
Figure 12:
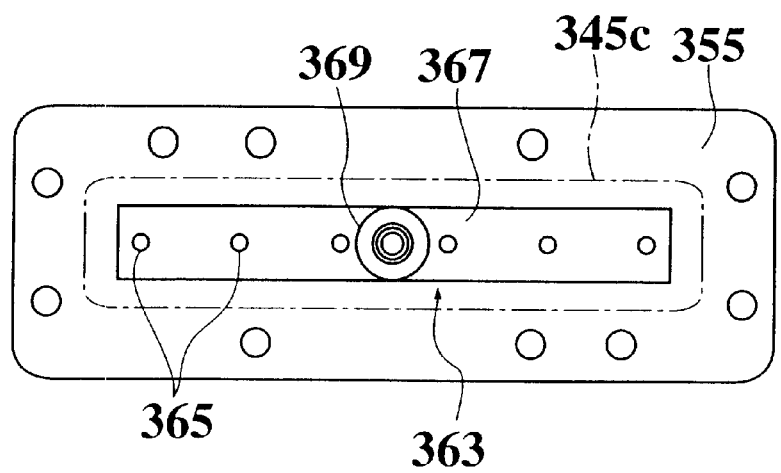
FIG. 12 is a plan view of FIG. 11.

To the surface of the flexible plate 355 on the side opposite to the side where the second block 335 is located there is connected a piston member 363 that protrudes to the outside through the through-hole 333b. As illustrated in FIG. 11 and FIG. 12 which is a plan view of FIG. 11, the piston member 363 is comprised of a support plate 367 fixed to a central part of the elastic plate 355 by a plurality of rivets 365 and a shaft 369 that is fixed to a central part of the support plate 367 on the side opposite to the side where the elastic plate 355 is located.

A shaft retaining member 371 is fixed to the first block 333 by bolts 373 in such a way as to surround the shaft 369. The shaft retaining member 371 has its lower part inserted into the through-hole 333b. And bushes 375 and 377 are respectively fitted on this inserted part and an exteriorly protruding part of the shaft retaining member 371. The piston member 363 comprised of the shaft 369 is moved in the direction of its being moved toward or away from the coating agent supply flow path 339 while being guided by the bushes 375, 377.

The end part of the shaft 369 on the side opposite to the side where the elastic plate 355 is located is fixed to roller retaining member 379. A roller 383 is rotatably retained by the roller retaining member 379 through a support shaft 381. A flange 379a is formed at the outer periphery of the end part of the roller retaining member 379 on the side of the first block 333 side. Between the flange 379a and the shaft retaining member 371 there is disposed a spring 385 which urges the roller retaining member 379 in the direction of its moving away from the first block 333.

On the other hand, on the side of the roller 383 opposite to the side where the shaft 369 is located there is disposed a cam 387 that rotates while being kept in contact with the roller 383 in a state where this cam 387 is fixed to a cam shaft 389. The cam shaft 389 is rotatably retained through bearings 395 by cam retaining members 393 that are fixed on the first block 333 by means of bolts 391. To one end of the cam shaft 389 there is connected an AC servo motor 399 through a coupling 397. The AC servo motor 399 is fixed to the first block 333 through a bracket 401.

Figure 13:
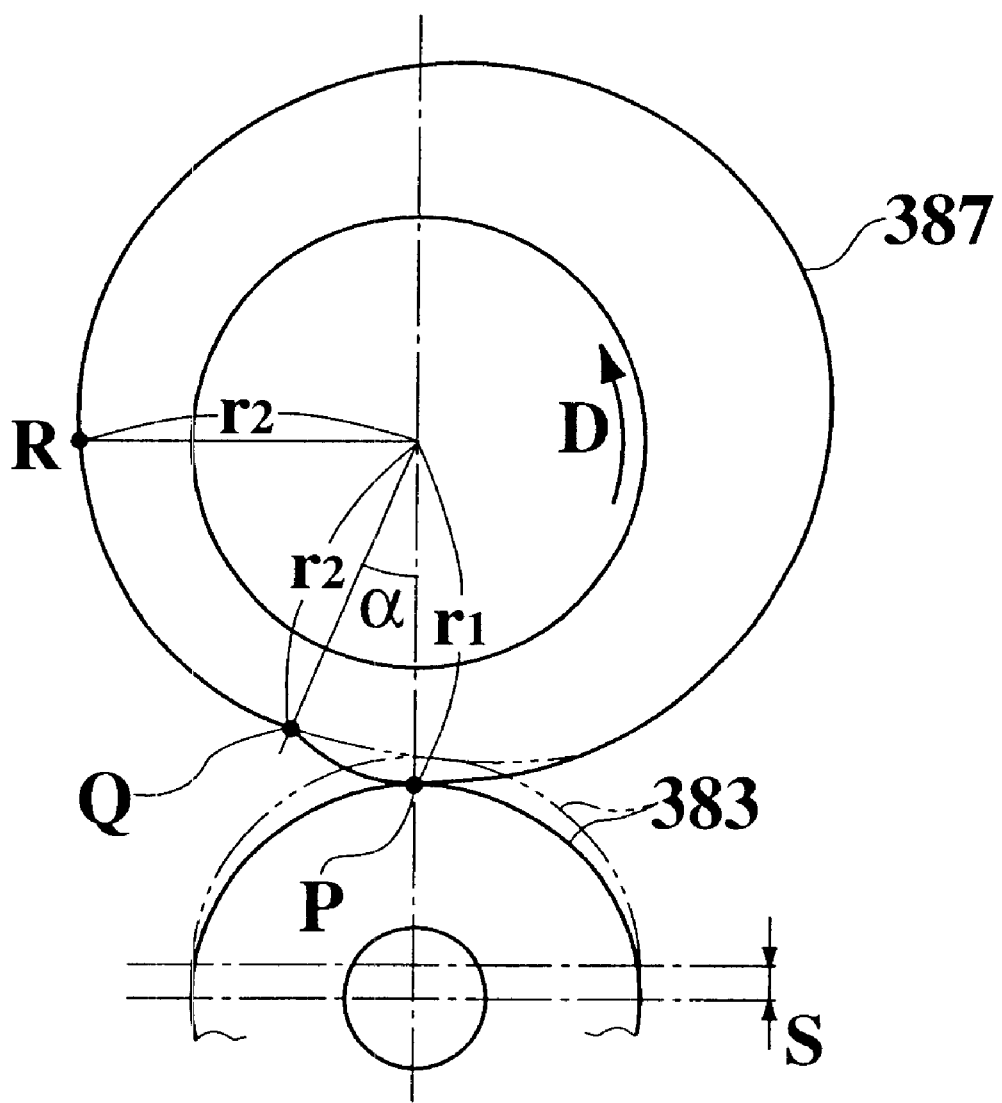
FIG. 13 is a side view illustrating on an enlarged scale a cam and a part of a roller used in the coating system of FIG. 9.

FIG. 13 illustrates respective parts of the cam 387 and roller 383 on an enlarged scale. The cam 387 rotates in the direction indicated by D. The cam 387 moves the roller 383 to a solid line position when in contact with the roller 383 at a point P and, in correspondence therewith, the elastic plate 355 is displaced in this direction through the piston member 363 and, as illustrated in FIGS. 9 and 10; is thereby kept substantially in a planar state. In this state, the coating agent supplied by the pump 351 is delivered from the delivery port 343 through the coating agent supply flow path 339. Accordingly, the elastic plate 355 takes its coating agent supply form when in such planar state.

On the other hand, when the cam 387 rotates through an angle α in the D direction from this state of FIG. 13 and then contacts with the roller 383 at a point Q, the roller 383 is moved to the position indicated by a two-dot chain line. In correspondence therewith, the elastic plate 355 is displaced by the urging force of the spring 385 in the direction of its moving away from the coating agent supply flow path 339. By this displacement of the elastic plate 355, there is formed a coating agent suction space K that is communicating with the coating agent supply flow path 339. Whereby, the coating agent within the coating agent supply flow path 339 is drawn into this coating agent suction space K with the result that the supply of the coating agent on the surface of the substrate 331 is dwelled. Accordingly, the elastic plate 355 takes its coating agent supply interrupt form when having been displayed in the direction of its moving away from the coating agent supply flow path 339.

A regards the radius of the cam 387, the radius r2 at the point Q (and a point R) is smaller than the radius r1 at the point P. Therefore, the radius of the cam 387 gradually increases from the point R in the direction reverse to the rotation direction of the cam 387 and becomes maximum at the point P. Accordingly, the movement distance S of the roller 383 when the cam 387 contacts with the points P and Q corresponds to the stroke of the piston member 363 and the elastic plate 355 is displaced by the extent corresponding to this stroke.

Figure 14A:
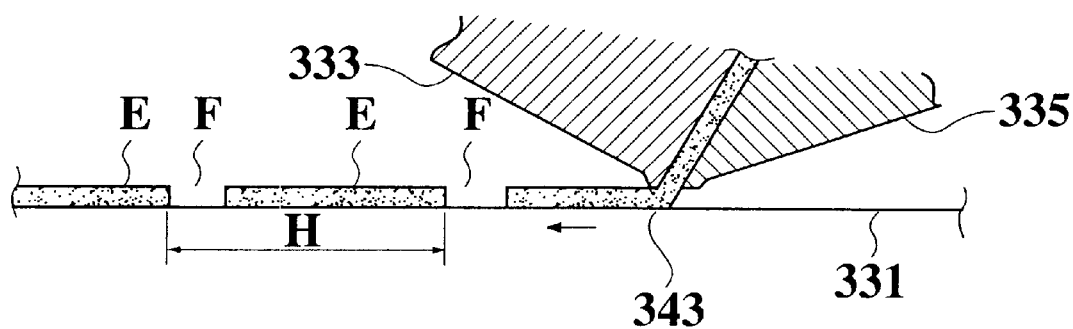
FIG. 14A is a schematic view illustrating a state where the coating agent is being delivered from the delivery port of the coating system of FIG. 9

Next, the operation of the coating system will be explained. First, as illustrated in FIGS. 9 and 10, when the elastic plate 355 is in its planar state, the coating agent delivered from the pump 351 flows into the coating agent supply flow path 339 through the coating agent supply pipe 349 and through the coating agent entrance flow path 347 and is delivered from the delivery port 343 and this coating agent is coated and the surface of the substrate 331. FIG. 14A is a schematic view illustrating the delivery port 343 and its vicinity, which view shows a state where the coating agent is being delivered from the delivery port 343 and coated on the surface of the substrate 331. At this time, the position of contact of the cam 387 with the roller 383 is in the range of from the point R to the point P through the rotation thereof in the D direction. As a result of this, coated parts E wherein the coating agent is coated are formed on the substrate 331.

On the other hand, when the cam 387 rotates in the D direction from the position illustrated in FIG. 13 at which the point P thereof contacts with the point Q, the roller 383 is brought to a two-dot chain line position. And in correspondence therewith, the elastic plate 355 is thereby brought to a two-dot chain line position, whereby the coating agent suction space K is formed.

Figure 14B:
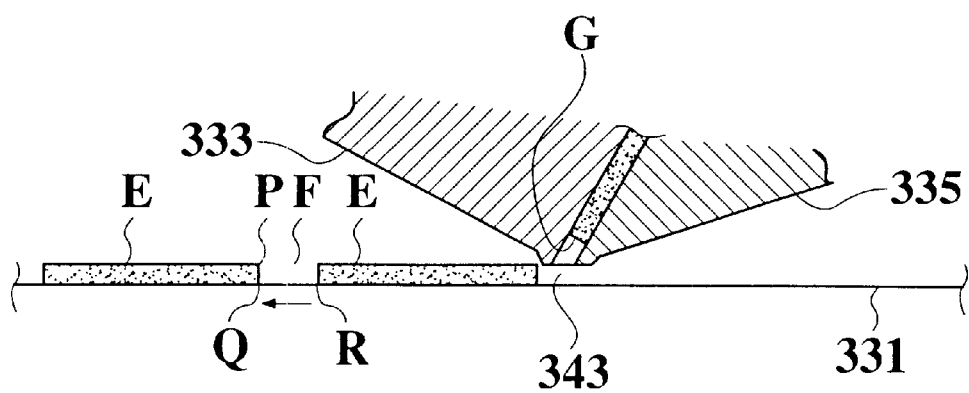
FIG. 14B is a schematic view illustrating a state where the delivery of the coating agent is being dwelled.

As a result of the formation of the coating agent suction space K, part of the coating agent that is being supplied successively to the coating agent supply flow path 339 is drawn into the coating agent suction space K. In correspondence therewith, as illustrated in FIG. 14B, the coating agent in the vicinity of the delivery port 343 is brought to the state of its being retracted into the coating agent supply flow path 339, with the result that the flow of the coating agent from the delivery port 343 is dwelled. Whereby, non-coated parts F wherein no coating agent is coated are formed between the point P and the point R of the cam 387.

Through this rotation of the cam 387, the elastic plate 355 is displaced, whereby the state where the coating agent is delivered as in FIG. 14A during a time period of from the point R to the point P of the cam 387 and the state where no coating agent is reliably delivered as in FIG. 14B during a time period of from the point P to the point R alternately occur repeatedly, with the result that an intermittent coating wherein the coated part E and non-coated part F are alternately formed is performed to the substrate 331.

According to the coating system, when forming the non-coated parts F, the coating agent within the coating agent supply flow path 339 is drawn into the coating agent suction space K, whereby the end part G of the thus-drawn in coating agent on the delivery port 343 side is brought to the state of its being retracted by a prescribed distance from the end of the delivery port 343 into the coating agent supply flow path 339. Therefore, the coating agent drips resulting from the residual pressure of the coating agent in the delivery port 343 are reliably avoided and, after the formation of the non-coated parts F, the buildups of the coat surface at the time of starting the formation of the coated parts E are also avoided, whereby a smooth and highly precise coat surface is obtained.

Also, since the intermittent coating is performed through the rotation of the cam 387, no time lag of the coating speed occurs, with the result that highly efficient intermittent coating can be performed. Further, the system is made into a structure wherein the elastic plate 355 is reciprocatingly deformation moved through the drive of the cam 387 and therefore it is not necessary to perform such high precision operations as to make it difficult to manufacture the system.

Here, as illustrated in FIG. 14A, the coating pitch H mm that corresponds to the sum of the length of the coated part E and the length of the non-coated part F corresponds to one rotation of the cam 387. For this reason, during a time period in which the cam 387 rotates through the angle α illustrated in FIG. 13 and further rotates up to the position at which the point R thereof contacts with a roller 383, the non-coated part F is formed. Assuming that the speed at which the substrate 331 is conveyed be V m/min, the rotations number N rpm of the cam 387 is calculated as (1000×V)/H.

Also, when forming the coated part E, the coating agent that corresponds to the part drawn into the coated agent suction space K is also coated on the substrate 331 by being pressed by the elastic plate 355, in addition the coating agent that is being delivered from the pump 351 successively in a fixed amount. For this reason, after the formation of the non-coated part F, when forming the next one coated part E, in order to obtain a predetermined thickness of the coat film, it is necessary to set as the amount of delivery of the pump 351 the amount that is obtained by subtracting the amount of the coating agent drawn into the coating agent suction space K from the amount of the coating agent corresponding to the coat film thickness that is obtained with only the amount of delivery of the pump 351.

The invention is not limited to the embodiments but permits various changes and modifications to be made without departing from the spirit and claimed scope of the invention.

What is claimed is:

1. The intermittent coating system comprising:
   a coating agent source for delivering a coating agent;
   a flow path for guiding the coating agent;
   a die unit for coating at least a portion of a surface of a substrate with the coating agent supplied from the flow path;
   an accumulator defining an accumulation chamber, the accumulator communicating with the flow path for accumulating the coating agent in the accumulation chamber and having a fitting member moveably fittable into at least a portion of the accumulation chamber; and
   a controller for controlling a volume of the coating agent and having a drive mechanism including a cam for driving the fitting member;
   wherein the coating of a surface of the substrate with the coating agent is capable of being interrupted depending on the position of the fitting member in the accumulation chamber.

2. The intermittent coating system as claimed in claim 1, wherein the the fitting member is slidably fittable to the accumulation chamber.

3. The intermittent coating system as claimed in claim 2, wherein the fitting member comprises a piston member.

4. The intermittent coating system as claimed in claim 2, wherein the cam corresponds to an intermittent cycle and a cam follower engages with the cam.

5. The intermittent coating system as claimed in claim 2, wherein the fitting member comprises a rubber plate member.

6. The intermittent coating system as claimed in claim 2, wherein the fitting member comprises an elastic plate member.

7. The intermittent coating system as claimed in claim 1, further comprising another flow path for guiding the coating agent delivered at a constant flow rate, another die unit for coating a reverse surface of the substrate with the coating agent supplied from the another flow path, and another accumulator communicating with the another flow path upstream the another die unit, for accumulating the coating agent.

8. An intermittent coating system comprising a die unit for coating a coating agent on at least a portion of a surface of a substrate being conveyed, wherein the die unit is disposed close to the surface of the substrate, and wherein the die unit is provided with a coating agent supply flow path having an open delivery port and an accumulation piece communicating with the coating agent supply flow path, wherein the accumulation piece is reciprocatingly movable between a coating agent supply position for supplying the coating agent on at least a portion of the surface of the substrate when the accumulation piece is located in a position closest to the coating agent supply flow path and a coating agent supply interrupt position for forming a coating agent suction space communicating with the coating agent supply flow path and spaced off from the coating agent supply flow path when the accumulation piece is moved away from the position closest to the coating agent supply flow path to interrupt supplying the coating agent on at least a portion of the surface of the substrate,
   wherein the die unit is provided with a regulating part that stops the movement of the accumulation piece that is moveable in a direction toward the coating agent supply flow path when the accumulation piece is located close to the coating agent supply flow path, and wherein the accumulation piece is biased by a spring to the coating agent supply position and is moved against the elastic force of the spring to the coating agent supply interrupt position by means of a cam.

9. The intermittent coating system as claimed in claim 8, wherein the delivery port of the coating agent supply flow path is provided over an almost entire width of the substrate and, in correspondence therewith, the accumulation piece and the coating agent suction space are also provided over an almost entire width of the substrate.

10. The intermittent coating system as claimed in claim 8, wherein the coating agent suction space is provided in the vicinity of the delivery port of the coating agent supply flow path.

11. The intermittent coating system as claimed in claim 8, wherein the die unit is disposed in pair so as to oppose the substrate and is so constructed as to coat the coating agent on both surfaces of the substrate.

12. An intermittent coating system comprising a die unit for coating a coating agent on at least a portion of a surface of a substrate being conveyed, wherein the die unit is disposed close to the surface of the substrate, and wherein the die unit is provided with a coating agent supply flow path having an open delivery port and an accumulation piece communicating with the coating agent supply flow path, wherein the accumulation piece is reciprocating movable between a coating agent supply position for supplying the coating agent on at least a portion of the surface of the substrate when the accumulation piece is located in a position closest to the coating agent supply flow path and a coating agent supply interrupt position for forming a coating agent suction space communicating with the coating agent supply flow path and spaced off from the coating agent supply flow path when the accumulation piece is moved away from the position closest to the coating agent supply flow path to interrupt supplying the coating agent on at least a portion of the surface of the substrate,
   wherein the accumulation piece is biased by a spring to the coating agent supply position and is moved to the coating agent supply interrupt position against the elastic force of the spring by means of a cam.

13. The intermittent coating system as claimed in claim 12, wherein the delivery port of the coating agent supply flow path is provided over an almost entire width of the substrate and, in correspondence therewith, the accumulation piece and the coating agent suction space are also provided over an almost entire width of the substrate.

14. The intermittent coating system as claimed in claim 12, wherein the coating agent suction space is provided in the vicinity of the delivery port of the coating agent supply flow path.

15. The intermittent coating system as claimed in claim 12, wherein the die unit is disposed in pair so as to oppose the substrate and is so constructed as to coat the coating agent on both surfaces of the substrate.

16. An intermittent coating system comprising a die unit for coating a coating agent on a surface of a substrate that is conveyed, wherein the die unit is located closely to the surface of the substrate, the die unit being equipped with a coating agent supply flow path having a delivery port that is open toward the surface of the substrate, the die unit defining a coating agent suction space communicating with the coating agent supply flow path and spaced off from the coating agent supply flow path, the die unit being provided with an elastic plate constituting at least a part of a wall of the coating agent suction space, wherein the elastic plate is displaceable between a coating agent supply position for supplying the coating agent on the surface of the substrate and a coating agent supply interrupt position, wherein the coating agent suction space is formed spaced off from the coating agent supply flow path between the coating agent supply flow path and the elastic plate when the elastic plate is displaced in a direction away from the coating agent supply flow path to thereby interrupt the supply of the coating agent on the surface of the substrate.

17. The intermittent coating system as claimed in claim 16, wherein the elastic plate is fixed at its peripheral edge to the die unit and is connected at its central part to a piston member that is movable in the direction of its being moved toward or away from the coating agent supply flow path.

18. The intermittent coating system is claimed in claim 16, wherein the elastic plate is biased toward the coating agent supply flow path by a spring and is moved away from the coating agent supply flow path against the elastic force of the spring by a cam.

19. An intermittent coating method comprising the steps of:

disposing that die unit for coating a coating agent on a surface of a substrate that is being conveyed at a position close to the surface of the substrate, the die unit being equipped with a coating agent supply flow path having a delivery port that is open toward the surface of the substrate, the die unit defining a coating agent suction space communicating with the coating agent supply flow path and spaced off from the coating agent supply flow path, and the die unit being provided with an elastic plate constituting at least a part of a wall of the coating agent suction space, wherein the elastic plate is moveable in the die unit in a direction toward the coating agent supply flow path and a direction away from the coating agent supply flow path;

supplying the coating agent on the surface of the substrate when the elastic plate is moved in the direction toward the coating agent supply flow path to a position closest to the coating agent supply flow path;

interrupting the supply of the coating agent on the surface of the substrate by displacing the elastic plate away from the position when the elastic plate is closest to the coating agent supply flow path, wherein the coating agent suction space is formed between the coating agent supply flow path and the elastic plate, and wherein the coating agent is drawn into the coating agent suction space; and alternating performing the supplying and interrupting steps repeatedly to thereby intermittently coat the coating agent on the surface of the substrate.

20. The intermittent coating method as claimed in claim 19, wherein an end part on a delivery port side of the coating agent drawn into the coating agent suction space is retracted into the coating agent supply flow path by a prescribed distance from a end of a delivery port.

21. The intermittent coating method as claimed in claim 19, wherein the die unit further comprises a coating agent supply means, wherein the coating agent is supplied successively in a fixed amount to the coating agent supply flow path by the coating agent supply means, and wherein the coating agent supply means supplies an amount of the coating agent that is obtained by subtracting an amount of the coating agent drawn into the coating agent suction space from an amount of the coating agent that is necessary when forming a predetermined thickness of the coating agent on the surface of the substrate that is coated.

* * * * *